United States Patent
Chun et al.

(10) Patent No.: US 10,523,361 B2
(45) Date of Patent: Dec. 31, 2019

(54) METHOD FOR OPERATING SOUNDING IN WIRELESS LAN SYSTEM, AND APPARATUS THEREFOR

(71) Applicant: LG ELECTRONICS INC., Seoul (KR)

(72) Inventors: Jinyoung Chun, Seoul (KR); Jinsoo Choi, Seoul (KR); Kiseon Ryu, Seoul (KR); Jeongki Kim, Seoul (KR); Hangyu Cho, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 45 days.

(21) Appl. No.: 15/742,437

(22) PCT Filed: Jul. 7, 2016

(86) PCT No.: PCT/KR2016/007387
§ 371 (c)(1),
(2) Date: Jan. 5, 2018

(87) PCT Pub. No.: WO2017/007266
PCT Pub. Date: Jan. 12, 2017

(65) Prior Publication Data
US 2019/0165883 A1    May 30, 2019

Related U.S. Application Data

(60) Provisional application No. 62/189,729, filed on Jul. 7, 2015, provisional application No. 62/260,312, filed on Nov. 26, 2015.

(51) Int. Cl.
*H04L 1/00* (2006.01)
*H04L 27/26* (2006.01)
(Continued)

(52) U.S. Cl.
CPC ............ *H04L 1/0026* (2013.01); *H04L 27/26* (2013.01); *H04W 72/0406* (2013.01);
(Continued)

(58) Field of Classification Search
None
See application file for complete search history.

(56) References Cited

U.S. PATENT DOCUMENTS

| | | | |
|---|---|---|---|
| 2013/0295513 A1* | 11/2013 | Ferry | ................... C30B 11/002 432/253 |
| 2015/0131517 A1 | 5/2015 | Chu et al. | |

(Continued)

FOREIGN PATENT DOCUMENTS

| WO | 2015006637 | 1/2015 |
|---|---|---|
| WO | 2015006640 | 1/2015 |
| WO | 2015068968 | 5/2015 |

OTHER PUBLICATIONS

PCT International Application No. PCT/KR2016/007387, Written Opinion of the International Searching Authority dated Oct. 17, 2016, 24 pages.

*Primary Examiner* — Anh Vu H Ly
(74) *Attorney, Agent, or Firm* — Lee Hong Degerman Kang & Waimey

(57) ABSTRACT

An embodiment of the present invention suggests a method in which an access point (AP) obtains channel quality information in a wireless LAN system. The AP transmits, to at least one station (STA), a null data packet announcement (NDP-A) frame including information on transmission of a subsequent null data packet (NDP) frame, and transmits an NDP frame to the at least one station on the basis of information on the NDP-A frame. Further, the AP receives, from the at least one STA, a feedback frame including downlink channel quality information. At this time, the NDP frame includes an L-part for a legacy STA and a high efficiency (HE)-part for a HE STA, wherein the HE-part consists of a HE-signaling A (HE-SIG A) field, a HE-short training field (HE-STF), and a HE-long training field (HE-LTF).

10 Claims, 11 Drawing Sheets

(51) Int. Cl.
*H04W 84/12* (2009.01)
*H04W 72/04* (2009.01)
*H04W 72/12* (2009.01)
*H04L 5/00* (2006.01)
*H04W 74/00* (2009.01)
*H04W 92/20* (2009.01)

(52) U.S. Cl.
CPC ... *H04W 72/0446* (2013.01); *H04W 72/1278* (2013.01); *H04W 84/12* (2013.01); *H04L 5/0007* (2013.01); *H04W 74/002* (2013.01); *H04W 92/20* (2013.01)

(56) References Cited

U.S. PATENT DOCUMENTS

| | | | |
|---|---|---|---|
| 2015/0146807 A1 | 5/2015 | Zhang et al. | |
| 2016/0100396 A1* | 4/2016 | Seok | H04L 5/003 370/329 |
| 2016/0143026 A1* | 5/2016 | Seok | H04W 72/0413 370/329 |
| 2016/0165574 A1* | 6/2016 | Chu | H04L 5/0007 370/312 |
| 2016/0262157 A1* | 9/2016 | Kim | H04L 5/0053 370/328 |
| 2016/0323424 A1* | 11/2016 | Merlin | H04L 69/22 370/328 |
| 2016/0330732 A1* | 11/2016 | Moon | H04B 7/0617 370/328 |
| 2016/0374085 A1* | 12/2016 | Chun | H04W 52/146 370/328 |
| 2017/0033898 A1* | 2/2017 | Chun | H04W 84/12 370/328 |
| 2017/0054542 A1* | 2/2017 | Vermani | H04L 5/0057 370/328 |
| 2017/0070914 A1* | 3/2017 | Chun | H04W 4/70 370/328 |
| 2017/0111148 A1* | 4/2017 | Park | H04L 5/0048 370/328 |
| 2017/0118764 A1* | 4/2017 | Sutskover | H04L 5/006 370/328 |
| 2017/0127440 A1* | 5/2017 | Chun | H04W 84/12 370/328 |
| 2017/0156148 A1* | 6/2017 | Park | H04L 5/0048 370/328 |
| 2017/0170937 A1* | 6/2017 | Chun | H04L 5/0048 370/328 |
| 2017/0171860 A1* | 6/2017 | Park | H04W 72/0453 370/328 |
| 2017/0171878 A1* | 6/2017 | Chun | H04L 5/00 370/328 |
| 2017/0180174 A1* | 6/2017 | Park | H04L 27/26 370/328 |
| 2017/0214561 A1* | 7/2017 | Lee | H04L 1/00 370/328 |
| 2017/0223665 A1* | 8/2017 | Chun | H04L 27/26 370/328 |
| 2017/0230218 A1* | 8/2017 | Park | H04L 5/0048 370/328 |
| 2017/0238286 A1* | 8/2017 | Chun | H04L 1/00 370/329 |
| 2017/0245306 A1* | 8/2017 | Kim | H04W 72/0413 370/328 |
| 2017/0272295 A1* | 9/2017 | Lee | H04L 5/00 370/328 |
| 2017/0289911 A1* | 10/2017 | Kim | H04W 28/06 370/328 |
| 2017/0295561 A1* | 10/2017 | Kim | H04W 72/04 370/328 |
| 2017/0302417 A1* | 10/2017 | Chun | H04L 27/26 370/328 |
| 2017/0303280 A1* | 10/2017 | Chun | H04L 27/26 370/328 |
| 2017/0310424 A1* | 10/2017 | Chun | H04L 1/16 370/328 |
| 2017/0311325 A1* | 10/2017 | Cariou | H04B 7/0452 370/328 |
| 2017/0338910 A1* | 11/2017 | Chun | H04L 1/00 370/328 |
| 2017/0338928 A1* | 11/2017 | Park | H04L 27/26 370/328 |
| 2017/0339692 A1* | 11/2017 | Chun | H04L 1/0003 370/328 |
| 2017/0367090 A1* | 12/2017 | Lim | H04W 72/04 370/328 |
| 2017/0373808 A1* | 12/2017 | Park | H04L 5/005 370/328 |
| 2018/0007661 A1* | 1/2018 | Chun | H04L 1/1861 370/328 |
| 2018/0091347 A1* | 3/2018 | Lee | H04L 5/0048 370/328 |
| 2018/0138959 A1* | 5/2018 | Chun | H04B 7/0626 370/328 |
| 2018/0145811 A1* | 5/2018 | Park | H04L 69/323 370/328 |
| 2018/0176066 A1* | 6/2018 | Lim | H04L 1/00 370/328 |
| 2018/0212725 A1* | 7/2018 | Park | H04L 27/26 370/328 |
| 2018/0220443 A1* | 8/2018 | Kim | H04W 84/12 370/328 |
| 2018/0263047 A1* | 9/2018 | Kim | H04B 7/26 370/328 |
| 2018/0288743 A1* | 10/2018 | Choi | H04W 76/10 370/328 |
| 2018/0331749 A1* | 11/2018 | Ghosh | H04L 1/00 370/328 |
| 2018/0359761 A1* | 12/2018 | Chun | H04L 5/00 370/328 |

* cited by examiner

METHOD FOR OPERATING SOUNDING IN WIRELESS LAN SYSTEM, AND APPARATUS THEREFOR

CROSS-REFERENCE TO RELATED APPLICATIONS

This application is the National Stage filing under 35 U.S.C. 371 of International Application No. PCT/KR2016/007387, filed on Jul. 7, 2016, which claims the benefit of U.S. Provisional Application Nos. 62/189,729, filed on Jul. 7, 2015 and 62/260,312, filed on Nov. 26, 2015, the contents of which are all hereby incorporated by reference herein in their entirety.

TECHNICAL FIELD

The present invention relates to a wireless LAN system, and more particularly, to a method for performing sounding for channel quality estimation by using an efficient NDP (Null Data Packet) frame format for sounding operation in an HE (High Efficiency) system, and an apparatus therefor.

BACKGROUND ART

While a frame transmission method proposed below is applicable to various types of wireless communication, a Wireless Local Area Network (WLAN) system will be described as an exemplary system to which the present invention is applicable.

WLAN Standards have been developed as Institute of Electrical and Electronics Engineers (IEEE) 802.11. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

Disclosure

Technical Problem

An object of the present invention is to prescribe an NDP frame format for efficiently performing NDP sounding in the above-described 11ax wireless LAN system and a sounding operation using the same.

The technical objects that can be achieved through the present invention are not limited to what has been particularly described hereinabove and other technical objects not described herein will be more clearly understood by persons skilled in the art from the following detailed description.

Technical Solution

To achieve the object of the present invention, in one aspect of the present invention, a method for enabling an access point (AP) to acquire channel quality information in a wireless LAN system comprises the steps of transmitting, to at least one station (STA), a null data packet announcement (NDP-A) frame including information on transmission of a subsequent null data packet (NDP) frame; transmitting an NDP frame to the at least one station on the basis of information on the NDP-A frame; and receiving, from the at least one STA, a feedback frame including downlink channel quality information, wherein the NDP frame includes an L-part for a legacy STA and a high efficiency (HE)-part for an HE STA, and the HE-part consists of an HE-signaling A (HE-SIG A) field, an HE-short training field (HE-STF), and an HE-long training field (HE-LTF).

Preferably, the NDP frame does not include a data field and an HE-signaling B (HE-SIG B) field.

The HE-SIG A field of the NDP frame does not include control information related to data transmission, and may consist of 1 OFDM symbol.

Another frame other than the NDP frame transmitted by the AP may include an HE-SIG A field of a 2-OFDM symbol length, and the NDP-A frame may include indicator information (NDP flag bit) indicating whether a subsequent frame is the NDP frame.

The NDP frame may include any one of a Single User Physical Protocol Data Unit (SU PPDU) format, a multi user PPDU (MU PPDU) format and a triggered PPDU format, and the HE-SIG A field may include a format field indicating that a format of the NDP frame has the SU PPDU format.

If the HE-SIG A consists of 1 OFDM symbol, the SU-PPDU format may not include a TXOP duration field and a spatial reuse field in the HE SIG-A field.

The HE-SIG A field of the NDP frame consists of 2 OFDM symbols, and may not include control information related to data transmission.

Meanwhile, in another aspect of the present invention, a method for enabling a station (STA) to transmit a frame for uplink channel quality information in a wireless LAN system comprises the steps of receiving, from at least one access point (AP), a null data packet announcement (NDP-A) frame including NDP frame transmission information of the STA, and a trigger frame; and transmitting an NDP frame to the AP on the basis of the NDP-A frame information, wherein the NDP frame includes an L-part for a legacy STA and a high efficiency (HE)-part for an HE STA, and the HE-part consists of an HE-signaling A (HE-SIG A) field, an HE-short training field (HE-STF), and an HE-long training field (HE-LTF).

The NDP frame may include any one of a Single User Physical Protocol Data Unit (SU PPDU) format, a multi user PPDU (MU PPDU) format and a triggered PPDU format, and the HE-SIG A field may include a format field indicating that a format of the NDP frame is the triggered PPDU.

The HE-SIG A field of the triggered PPDU format consists of 1 OFDM symbol, and may include a TXOP duration field and a spatial reuse field in the SIG-A field.

Meanwhile, in still another aspect of the present invention, an access point (AP) apparatus operated in a wireless LAN system comprises a transceiver transmitting, to at least one station (STA), a null data packet announcement (NDP-A) frame including information on transmission of a subsequent null data packet (NDP) frame and an NDP frame according to the NDP-A frame information and receiving, from the at least one STA, a feedback frame including downlink channel quality information; and a processor generating the NDP-A frame and the NDP frame, delivering the generated NDP-A frame and NDP frame to the transceiver and receiving the feedback frame from the transceiver, wherein the processor is configured such that the NDP frame includes an L-part for a legacy STA and a high efficiency (HE)-part for a HE STA, and the processor is generated such that the HE-part consists of an HE-signaling A (HE-SIG A) field, an HE-short training field (HE-STF), and an HE-long training field (HE-LTF).

Preferably, the processor is generated such that the NDP frame does not include a data field and an HE-signaling B (HE-SIG B) field.

The processor may be generated such that the HE-SIG A field of the NDP frame does not include control information related to data transmission and consists of 1 OFDM symbol.

Meanwhile, in further still another aspect of the present invention, a station (STA) apparatus operated in a wireless LAN system comprises a transceiver receiving, from at least one access point (AP), a null data packet announcement (NDP-A) frame including NDP frame transmission information of the STA and a trigger frame and transmitting an NDP frame to the AP on the basis of the NDP-A frame information; and a processor processing at least one of the NDP-A frame and the trigger frame, which are received from the transceiver, and generating the NDP frame and delivering the generated NDP frame to the transceiver, wherein the processor is generated such that the NDP frame includes an L-part for a legacy STA and a high efficiency (HE)-part for an HE STA, and the HE-part consists of an HE-signaling A (HE-SIG A) field, an HE-short training field (HE-STF), and an HE-long training field (HE-LTF).

The processor may be generated such that the HE-SIG A field of the NDP frame consists of 1 OFDM symbol and includes a TXOP duration field and a spatial reuse field in the SIG-A field.

Advantageous Effects

According to one embodiment of the present invention, efficient NDP sounding optimized for an HE system to minimize signaling overhead may be performed.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters.

In some cases, to prevent the concept of the present invention from being ambiguous, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

Figure 1:
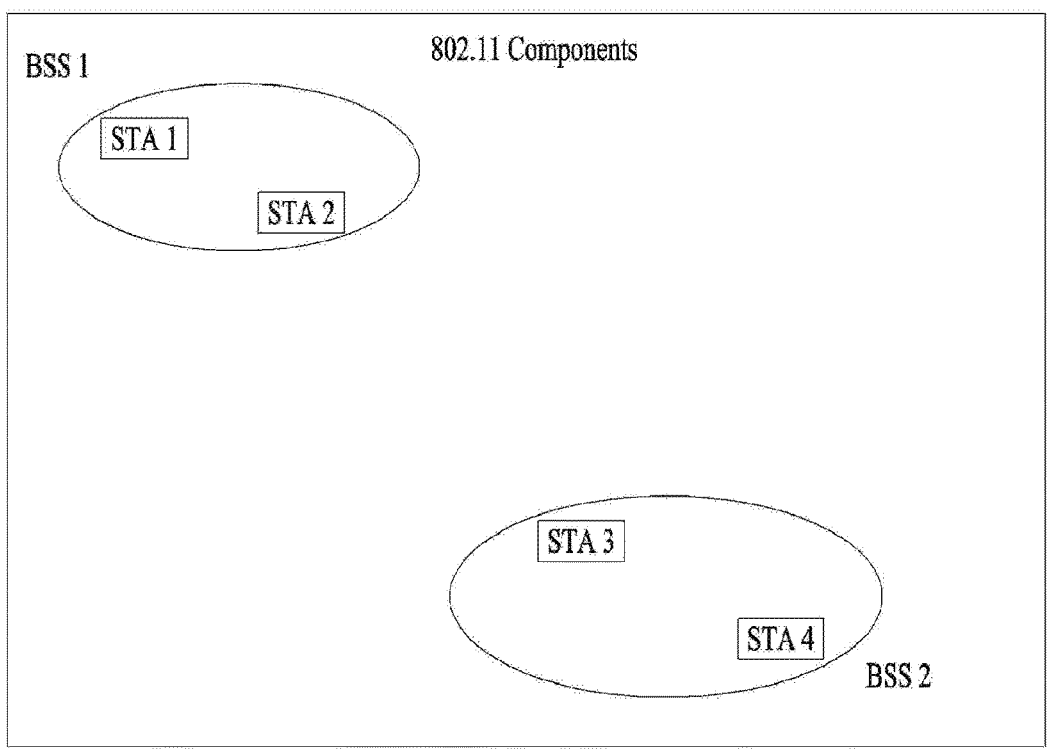
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
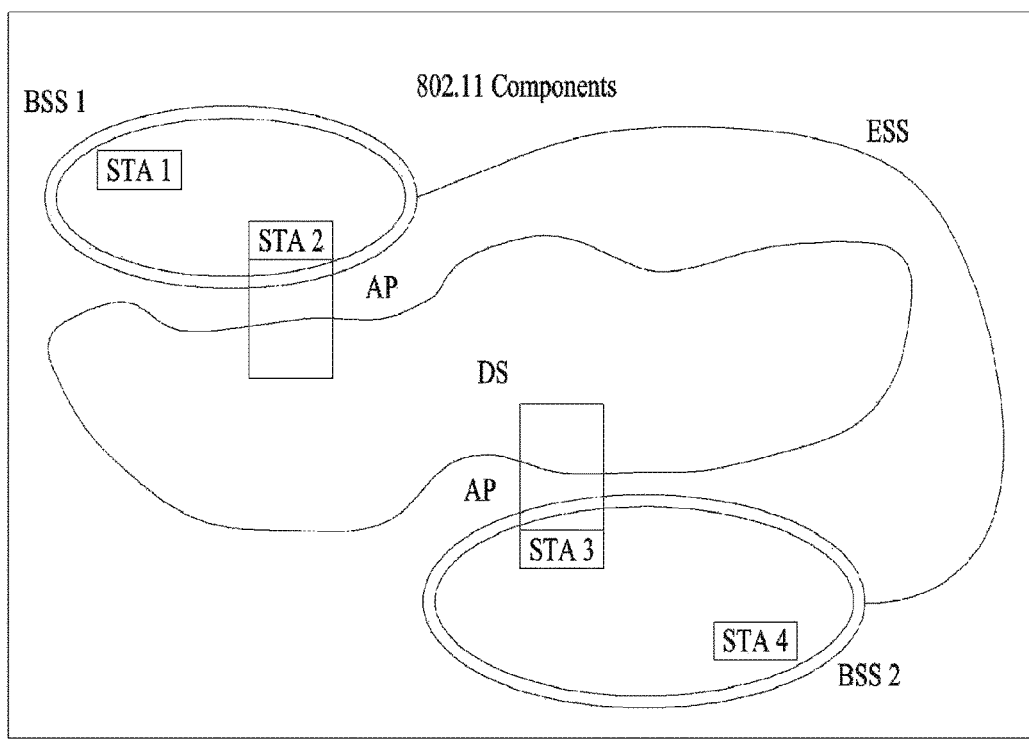
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
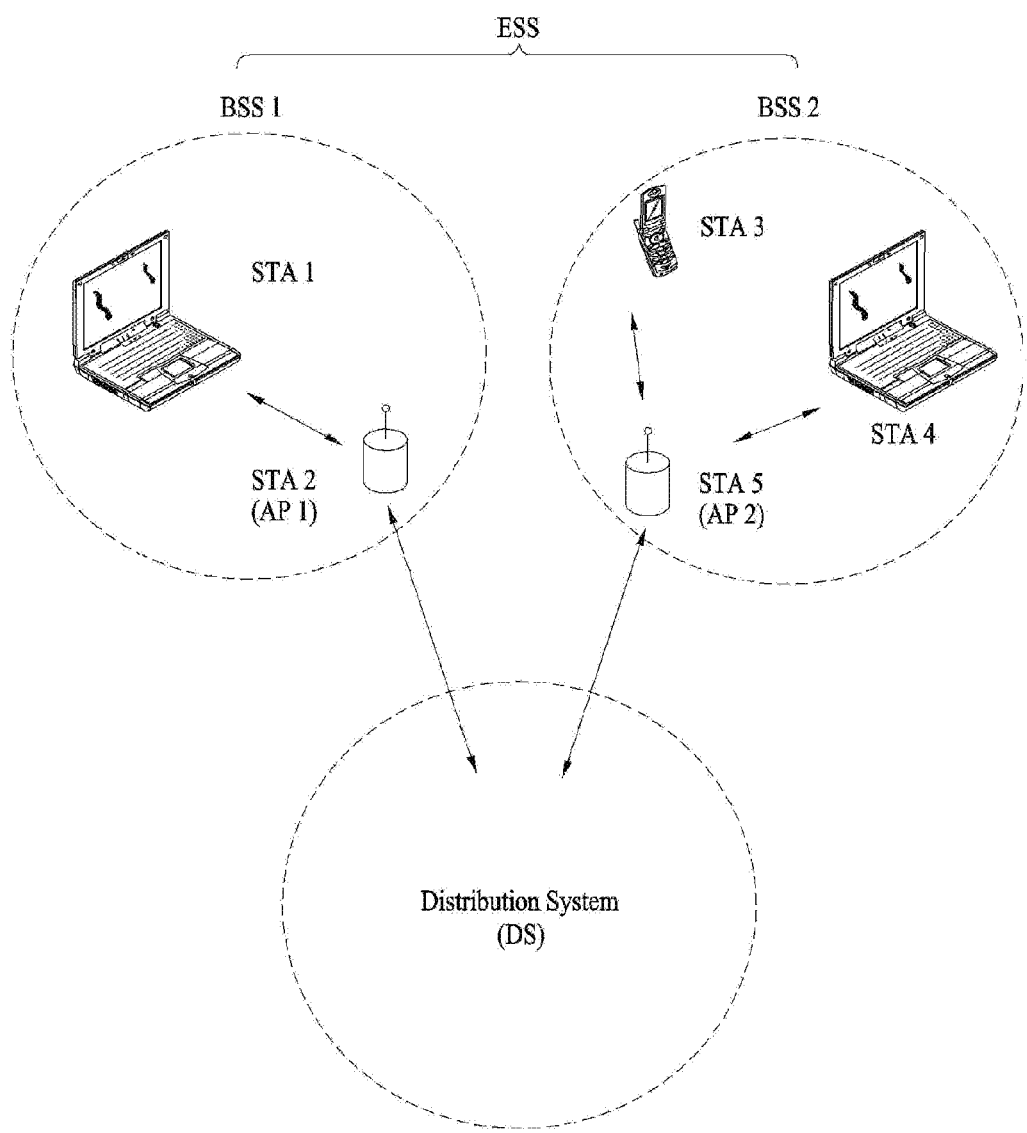
FIG. 3 is a diagram for an exemplary configuration of a WLAN system.

FIG. 3 is a diagram for an exemplary configuration of a WLAN system. FIG. 3 shows an example of a base structure BSS including a DS.

According to an example shown in in FIG. 3, a BSS1 and a BSS2 construct an ESS. In a WLAN system, an STA corresponds to a device operating according to MAC/PHY regulation of IEEE 802.11. An STA includes an AP STA and a non-AP STA. In general, the non-AP STA corresponds to such a device directly handled by a user as a laptop computer, a mobile phone and the like. In the example of FIG. 3, an STA 1, an STA 3 and an STA 4 correspond to the non-AP STA and an STA 2 and an STA 5 correspond to the AP STA.

In the following description, the non-AP STA may be referred to as a terminal, a WTRU (wireless transmit/receive unit), a UE (user equipment), an MS (mobile station), a mobile terminal, an MSS (mobile subscriber station) and the like. And, an AP is a concept corresponding to a BS (base station), a Node-B, an eNB (evolved Node-B), a BTS (base transceiver system), a femto BS, and the like in a different wireless communication field.

Figure 4:
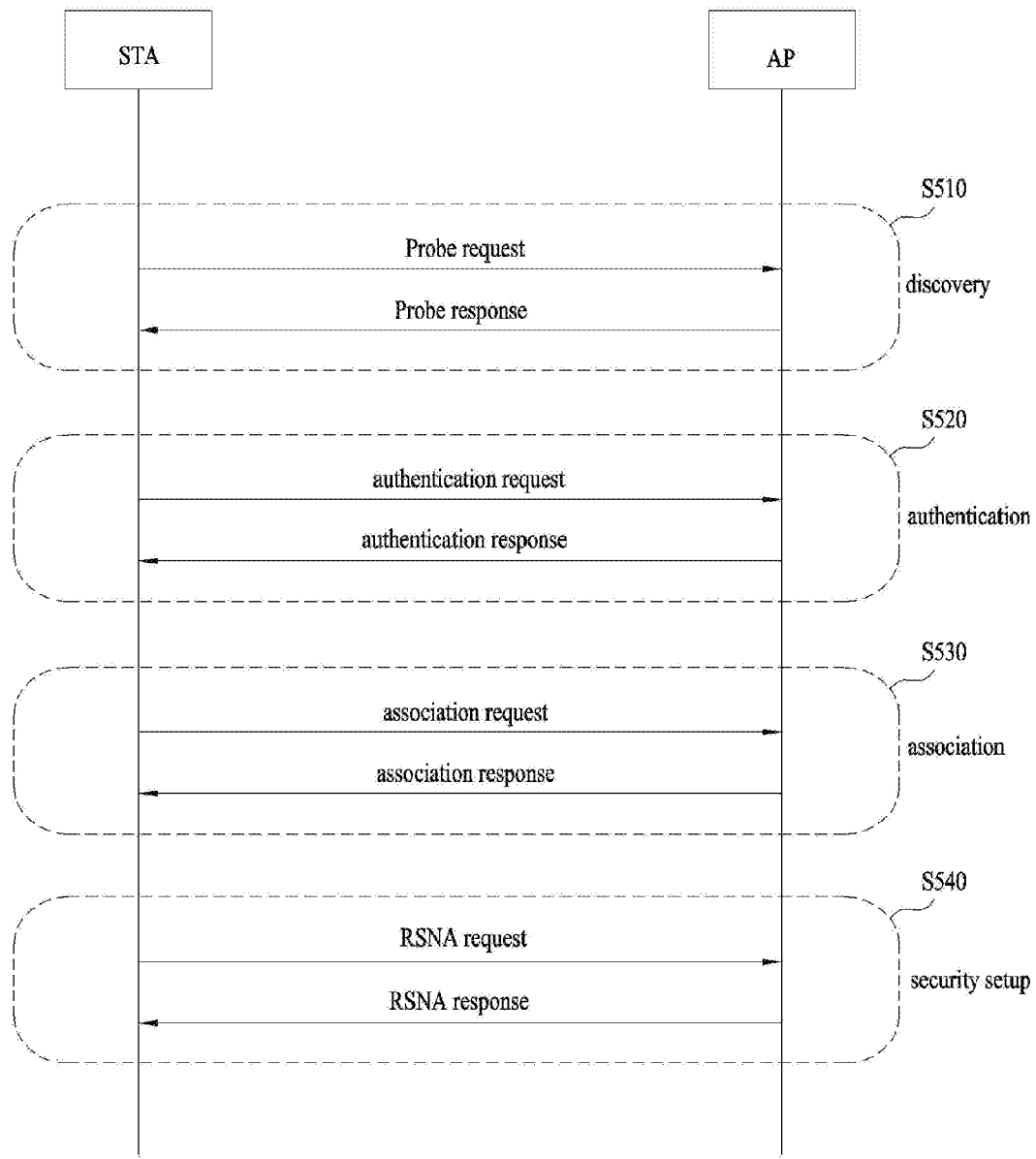
FIG. 4 is a diagram illustrating a link setup procedure in a WLAN system.
Figure 5:
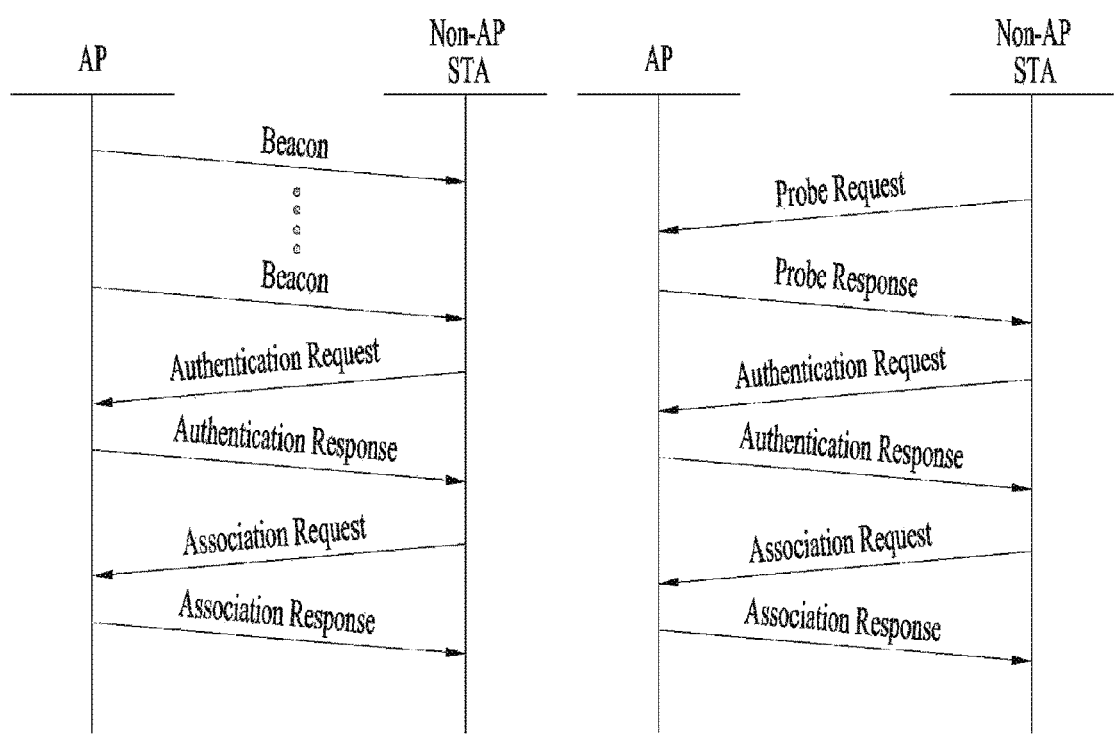
FIG. 5 is a diagram illustrating an active scanning and passive scanning method.

FIG. 4 is a flowchart illustrating a link setup procedure in a WLAN system, and FIG. 5 is a view illustrating an active scanning method and a passive scanning method.

In order for an STA to set up a link with a network and transceive data with the network, it is necessary for the station to discover the network, perform authentication, establish association, and pass through an authentication procedure for security. The link setup procedure may be referred to as a session initiation procedure or a session setup procedure. Also, discovery, authentication, association, and security setup procedures of the link setup procedure may be commonly called an association procedure.

An example of the link setup procedure will be described with reference to FIG. 4.

In step S410, an STA may perform a network discovery operation. The network discovery operation may include a scanning operation of the STA. That is, in order for the STA to access a network, it is necessary for the STA to find out a network in which the STA is able to participate. The STA needs to identify a compatible network before participating in a wireless network. A procedure of identifying a network existing at a specific region is called scanning A scanning scheme includes active scanning and passive scanning Although a network discovery operation including an active scanning procedure is shown in FIG. 4, an STA may operate with a passive scanning procedure.

According to the active scanning, an STA that performs scanning transmits a probe request frame to a responder to discover an AP existing in the vicinity of the STA while switching channels and waits for a response. The responder transmits a probe response frame to the STA, which has transmitted the probe request frame, in response to the probe request frame. In this case, the responder may correspond to an STA, which has lastly transmitted a beacon frame in a BSS on a channel being scanned. In the BSS, since an AP transmits a beacon frame, the AP becomes the responder. In an IB SS, since STAs in the IBSS alternately transmit a beacon, the responder is not fixed. For example, if an STA transmits a probe request frame on a channel 1 and receives a probe response frame on the channel 1, the STA stores BSS-related information included in the received probe response frame, moves to a next channel (e.g., a channel 2), and then is capable of performing scanning (i.e., transmit and receive a probe request/response on the channel 2) in the same manner.

Also, referring to FIG. 5, scanning may also be performed by a passive scanning scheme. According to the passive scanning, an STA that performs scanning waits for a beacon frame while switching channels. The beacon frame is one of management frames in IEEE 802.11. The beacon frame is periodically transmitted to indicate the existence of a wireless network and allows the STA, which performs scanning, to discover and participate in the wireless network. In a BSS, an AP plays a role in periodically transmitting a beacon frame. In an IBSS, STAs belonging to the IBSS alternately transmit a beacon frame. Having received a beacon frame, the STA, which performs scanning, stores information on the BSS included in the beacon frame and records beacon frame information on each channel while switching to a different channel. The STA, which has received the beacon frame, stores BSS-related information included in the received beacon frame, moves to a next channel, and is capable of performing scanning on the next channel in the same manner.

When the active scanning and the passive scanning are compared, the active scanning has a merit in that delay is less and power consumption is lower than the passive scanning After the network is discovered by the STA, an authentication procedure may be performed in step S420. In order to clearly distinguish the authentication procedure from a security setup operation of the following step S440, the authentication procedure may be referred to as a first authentication procedure.

According to the authentication procedure, the STA transmits an authentication request frame to the AP, and the AP transmits an authentication response frame to the STA in response to the authentication request frame. An authentication frame used in the authentication request/response corresponds to a management frame.

The authentication frame may include information on an authentication algorithm number, an authentication transaction sequence number, a status code, a challenge text, a Robust Security Network (RSN), a finite cyclic group, and the like. The above-mentioned information is only an example of information capable of being included in the authentication request/response. The information may be replaced with different information or may further include additional information.

The STA may transmit the authentication request frame to the AP. The AP may determine whether to grant authentication on the STA based on the information included in the received authentication request frame. The AP may provide the station with a result of the authentication procedure via the authentication response frame.

If the STA is successfully authenticated, an association procedure may be performed in step S430. According to the association procedure, the STA transmits an association request frame to the AP, and the AP transmits an association response frame to the STA in response to the association request frame.

For example, the association request frame may include such information as information related to various capabilities, a beacon listening interval, an SSID (service set identifier), supported rates, supported channels, an RSN, a mobility domain, supported operating classes, a TIM (traffic indication map broadcast request), interworking service capability, and the like.

For example, the association response frame may include such information as information related to various capabilities, a status code, an Association ID (AID), supported rates, an Enhanced Distributed Channel Access (EDCA), a parameter set, a Received Channel Power Indicator (RCPI), a Received Signal to Noise Indicator (RSNI), a mobility domain, a timeout interval (association comeback time), an overlapped BSS scan parameter, TIM broadcasting response, QoS map, and the like.

The above-mentioned information is only an example of information capable of being included in the association request/response frame. The information may be replaced with different information or may further include additional information.

If the STA is successfully associated with the network, the security setup procedure may be performed in step S540. The security setup procedure of the step S540 may be referred to as an authentication procedure via an RSNA (robust security network association) request/response. The authentication procedure of the step S520 may be referred to as a first authentication procedure, and the security setup procedure of the step S540 may simply be referred to as an authentication procedure.

For example, the security setup procedure of the step S440 may include a private key setup procedure via 4-way handshaking through an Extensible Authentication Protocol over LAN (EAPOL) frame. Also, the security setup procedure may also be performed according to a security scheme not defined in the IEEE 802.11 standard.

Figure 6:
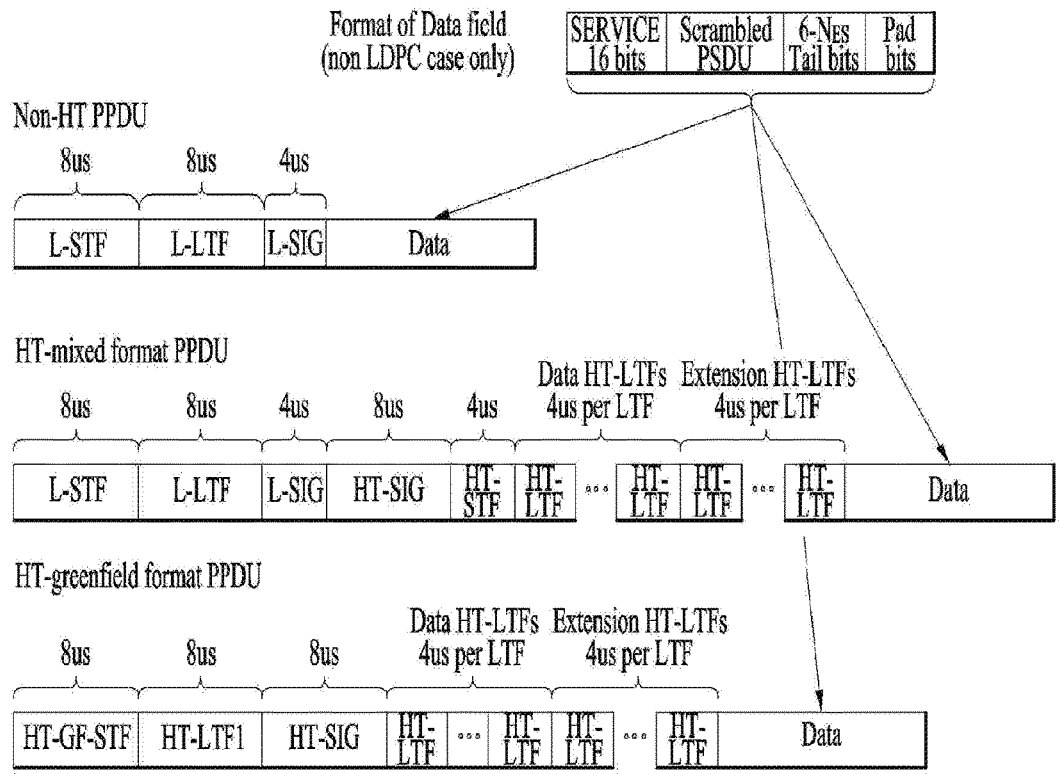
FIG. 6 is a diagram illustrating an example of a frame structure used in an IEEE 802.11 system.
Figure 7:
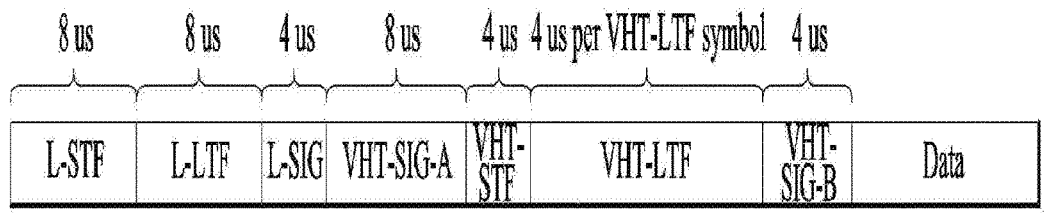
FIG. 7 is a diagram illustrating an example of a VHT (Very High Throughput) PPDCU format.

FIGS. 6 and 7 are diagrams illustrating examples of a frame structure used in an IEEE 802.11 system.

A station (STA) may receive a physical layer packet data unit (PPDU). At this time, a PPDU frame format may include a short training field (STF), a long training field (LTF), a signal (SIG) field and a data field. At this time, for example, the PPDU frame format may be set based on the type of the PPDU frame format.

For example, a non-high throughput (HT) PPDU frame format may include a legacy-STF (L-STF), a legacy-LTF (L-LTF), an SIG field and a data field.

Also, any one of an HT-mixed format PPDU and an HT-Greenfield format PPDU may be set as the type of the PPDU frame format. At this time, in the above-described PPDU format, additional (different types of) STFs, LTFs and SIG fields may be included between the SIG field and the data field.

Also, referring to FIG. 7, a very high throughput (VHT) PPDU format may be set. At this time, even in the VHT PPDU format, additional (different types of) STFs, LTFs and SIG fields may be included between the SIG field and the data field. More specifically, in the VHT PPDU format, at least one of a VHT-SIG-A field, a VHT-STF field, a VHT-LTF field and a VHT SIG-B field may be included between the L-SIG field and the data field.

At this time, the STF may be a signal for signal detection, automatic gain control (AGC), diversity selection, accurate time synchronization, etc. Also, the LTF may be a signal for channel estimation, frequency error estimation, etc. A combination of the STF and the LTF may be referred to as a PLCP preamble. The PLCP preamble may refer to a signal for synchronization and channel estimation of an OFDM physical layer.

The data field may include a SERVICE field, a PLCP service data unit (PSDU) and a PPDU TAIL bit, and may further include a padding bit if necessary.

HE PPDU Format

Although a frame structure for IEEE 802.11ax has not been determined yet, it may be able to anticipate it as follows.

Figure 8:
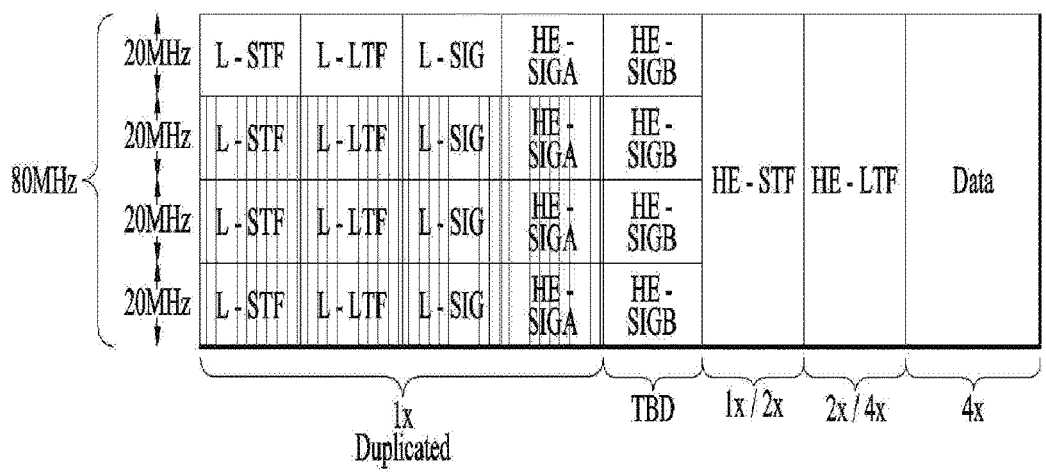
FIG. 8 is a diagram illustrating an example of an HE (High Efficiency) PPDU format according to one embodiment of the present invention.

FIG. 8 is a diagram for an example of a HE (high efficiency) PPDU format according to one embodiment of the present invention.

Similar to the frame structure shown in FIG. 8, 11ax maintains a legacy 1× symbol structure (3.2 us) until HE-SIG (SIG-A, SIG-B). HE-preamble and data part may use a frame structure including 4× symbol (12.8 us) structure. Of course, unless it is directly contrary to the following description, although the aforementioned structure is changed, the present invention may be applied to the aforementioned structure without any problem.

L-part may follow L-STF, L-LTF, and L-SIG configuration according to a form maintained by a legacy WiFi system as it is. In general, it is preferable for the L-SIG to deliver packet length information. HE-part corresponds to a part newly configured for the 11ax standard (high efficiency). HE-SIG (HE-SIGA and HE-SIGB) may exist between the L-part and HE-STF and may indicate common control information and user specific information. Specifically, the HE-SIG may include HE-SIF-A for delivering the common control information and HE-SIG B for delivering the user specific information.

As shown in FIG. 8, the HE-SIG A may be configured over two OFDM symbols. Also, HE-SIG B may include a common field and a user specific field.

NDP Sounding Operation

Figure 9:
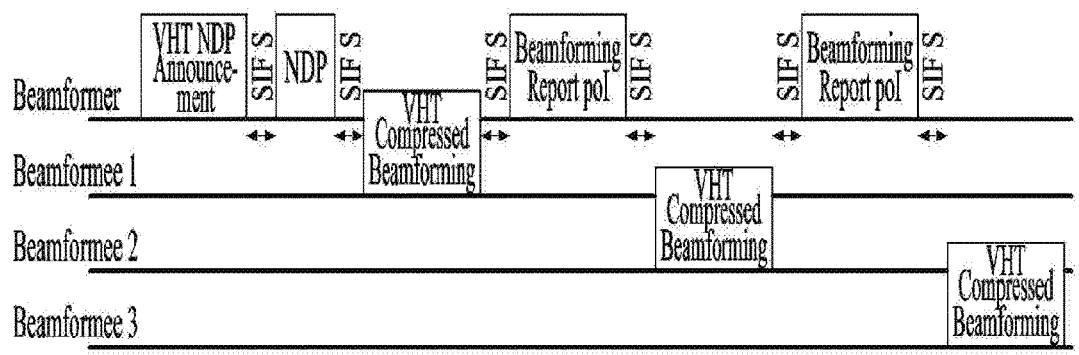
FIGS. 9 and 10 are diagrams illustrating an NDP sounding operation in a 11ac system and an NDP frame format used during the NDP sounding operation.
Figure 10:
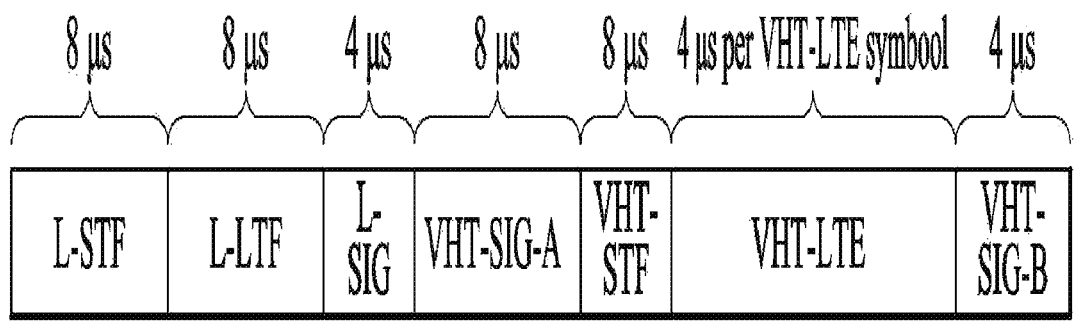

FIGS. 9 and 10 are diagrams illustrating an NDP sounding operation in a 11ac system and an NDP frame format used during the NDP sounding operation.

The AP needs to acquire downlink channel quality information to perform an beamforming operation. To this end, the AP may perform sounding for acquisition of channel state information (CSI) as shown in FIG. 9. First of all, the AP may transmit an NDP-A (NDP Announcement) frame, which includes information on NDP frame transmission, before transmitting an NDP frame that does not include a data field. To measure downlink channel quality. After a predetermined time (for example, SIFS) from NDP-A frame transmission, the AP may transmit the NDP frame to each STA and receive feedback information from each STA based on the NDP frame.

At this time, an NDP frame format transmitted by the AP may include a field as shown in FIG. 10. First of all, the NDP frame may include L-part and VHT-part for legacy STAs, wherein the VHT part may include VHT-SIG A, VHT-STF, VHT-LTF and VHT-SIG B fields.

NDP Sounding Operation in 11ax System

Figure 11:
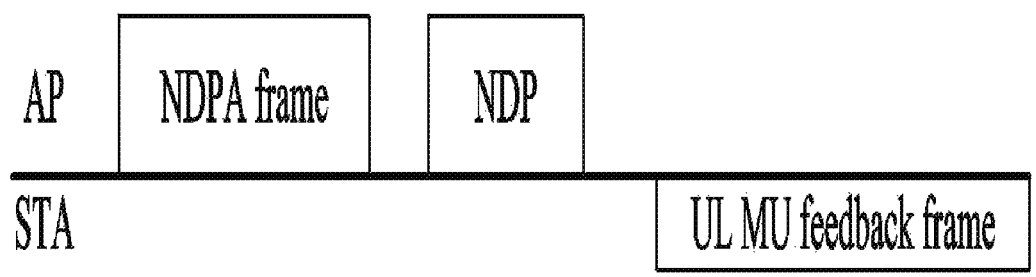
FIGS. 11 and 12 are diagrams illustrating a method for performing NDP sounding in a 11ax system in accordance with one embodiment of the present invention.
Figure 12:
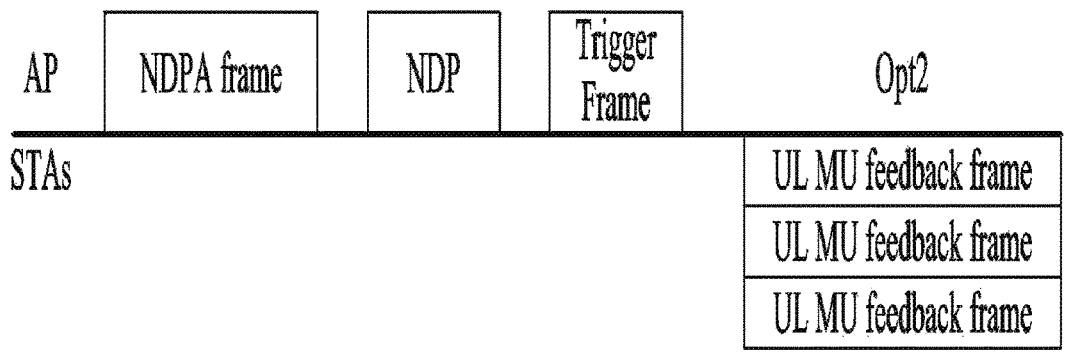

FIGS. 11 and 12 are diagrams illustrating a method for performing NDP sounding in a 11ax system in accordance with one embodiment of the present invention. In more detail, FIG. 11 illustrates a method for performing sounding in a way of SU, and FIG. 12 illustrates a method for performing sounding in a way of MU.

First of all, the AP transmits an NDP-A (NDP Announcement), which includes information on subsequent NDP frame transmission, to one or more stations (STAs). Preferably, this NDP-A frame includes indicator information (e.g., NDP flag bit) indicating whether a subsequent frame is an NDP frame having a format, which will be described, or a frame having a general PPDU format shown in FIG. 8.

The AP that has transmitted the NDP-A frame transmits the NDP frame to one or more STAs on the basis of the NDP-A frame information. In one aspect of the present invention, it is suggested that the NDP frame transmitted as above is configured in the form of NDP frame optimized for HE system to minimize overhead. This will be described hereinafter.

If NDP sounding is performed in the form of MU as shown in FIG. 12, the AP may additionally transmit a trigger frame to receive a feedback frame in the form of MU. However, in NDP sounding in the form of SU, such trigger frame transmission may be omitted.

One or more STAs that have received the NDP frame may measure a downlink channel on the basis of information of the NDP frame and transmit the feedback frame based on the measured downlink channel to the AP.

Figure 13:
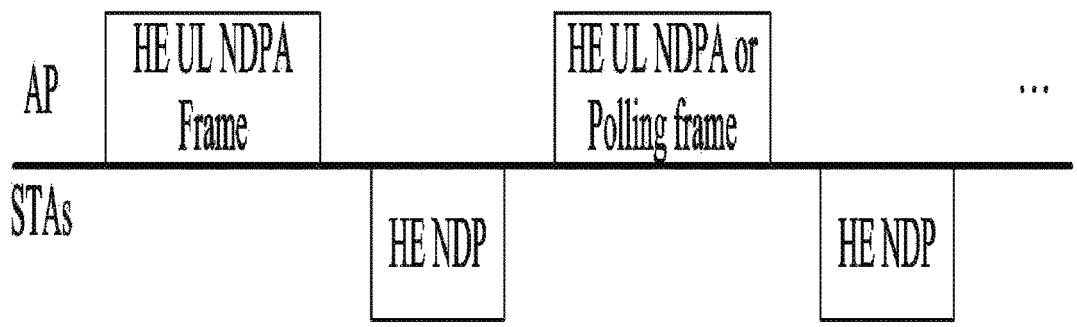
FIG. 13 is a diagram illustrating a sounding method for acquiring uplink channel information in a 11ax system in accordance with one embodiment of the present invention.

FIG. 13 is a diagram illustrating a sounding method for acquiring uplink channel information in a 11 ax system in accordance with one embodiment of the present invention.

In this embodiment, the AP may transmit HE UL NDP-A frame for deriving NDP frame transmission to STAs to acquire uplink channel information. Therefore, the STAs may transmit HD-NDP frame.

Also, the NDP frame transmission of the STA may be derived through a polling frame or trigger frame not the HE UL NDP-A frame.

Figure 14:
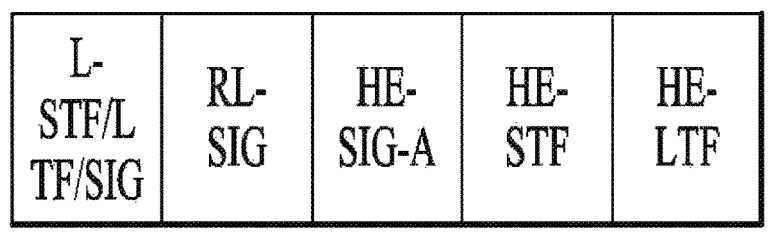
FIG. 14 is an example of an NDP frame format which will be used in an HE system in accordance with one embodiment of the present invention.

FIG. 14 is an example of an NDP frame format which will be used in an HE system in accordance with one embodiment of the present invention.

First of all, the NDP frame shown in FIG. 14 may include L-part for a legacy STA and HE-part for HE STA. It is suggested that the HE-part consists of HE-SIG A, HE-STF and HE-LTF fields as shown in FIG. 14 and that HE-SIG B field is omitted.

Since the aforementioned NDP frame is transmitted in a state that the data field is omitted, and information for channel measurement is commonly included in each STA, it is not advantageous that the NDP frame additionally includes HE-SIG B field that includes control information per STA. Also, the VHT-SIG B field in the 11ac system shown in FIG. 10 may be arranged after VTH-LTF to give a spare time for a processing time of the STA. However, since the SIG B field in the 11 ax system shown in FIG. 8 is arranged prior to HE-SFT and HE-LTF, it is difficult to give a spare time for a processing time of the STA.

Therefore, in this embodiment, it is assumed that an NDP frame format, which does not include HE-SIG B field, is used as shown in FIG. 14. Hereinafter, a method for optimizing each field under the assumption, especially a method for optimizing an HE-SIG A field will be described.

SIG-A Field of NDP Frame

First of all, examples of a PPDU format that may be used in the 11ax system include SU-PPDU, MU-PPDU, and triggered PPDU. It is assumed that information included in HE-SIG A in each PPDU format is as follows.

First of all, the following Table 1 illustrates information included in HE SIG-A of SU-PPDU, Table 2 illustrates information included in HE-SIG A of HE-TIRG-PPDU, and Table 3 illustrates information included in HE-SIG A of HE-MU-PPDU.

TABLE 1

| Field | Number of bits | Description |
| --- | --- | --- |
| DL/UL | 1 | Indicates whether the HE_SU PPDU is UL or DL. This field indicates DL for TDLS. NOTE - The TDLS peer can identify the TDLS frame by To DS and From DS fields in the MAC header of the 11ax MPDU. |
| Format | 1 | Differentiate between an HE_SU PPDU and a HE_TRIG PPDU |
| BSS Color | 6 | The BSS Color field is an identifier of the BSS |
| Spatial Reuse | 6 | TBD |
| TXOP Duration | 6 (or 5) | Indicates the remaining time in the current TXOP. Details TBD. |
| Bandwidth | 2 | Set to 0 for 20 MHz, 1 for 40 MHz, 2 for 80 MHz, 3 for 160 MHz and 80 + 80 MHz |
| MCS | 4 | HE-MCS index |
| CP + LTF Size | 3 | To indicate the CP length and HE-LTF size, the current combinations are 1x HE-LTF + 0.8 µS, 2x HE-LTF + 0.8 µS, 2x HE-LTF + 1.6 µS and 4x HE-LTF + 3.2 µS. Other combinations are TBD. |
| Coding | 2 | Indication of BCC/LDPC and presence of the extra OFDM symbol for LDPC. Detailed indication is TBD |
| Nsts | 3 | Indication of number if spatial streams: Set to 0 for 1 space time stream Set to 1 for 2 space time streams Set to 2 for 3 space time streams Set to 3 for 4 space time streams Set to 4 for 5 space time streams Set to 5 for 6 space time streams Set to 6 for 7 space time streams Set to 7 for 8 space time streams |

TABLE 1-continued

| Field | Number of bits | Description |
|---|---|---|
| STBC | 1 | Set to 1 if space time block coding is used and set to 0 otherwise. |
| TxBF | 1 | Set to 1 if a Beamforming steering matrix is applied to the waveform in an SU transmission, set to 0 otherwise. |
| DCM | 1 | Set to 1 indicates that the payload of the SU PPDU is modulated with dual sub-carrier modulation for the MCS. Set to 0 indicates that the payload of the PPDU is not modulated with dual sub-carrier modulation for the MCS. |
| Packet Extension | 3 | The first two bits indicate the "a-factor" and the third bit indicates the PE-Disambiguity. |
| Beam Change | 1 | Set to 1 indicates that the pre-HE-STF portion of the SU PPDU is spatially mapped differently from HE-LTF1. Set to 0 indicates that the pre-HE-STF portion of the SU PPDU is spatially mapped the same way as HE-LTF1 on each tone. |
| CRC | 4 | CRC calculated as in 20.3.9.4.4 (CRC calculation for HT-SIG) |
| Tail | 6 | Used to terminate the trellis of the convolutional decoder. Set to 0. |
| Total | 51 (or 50) | 1 (or 2) reserved |

TABLE 2

| Field | Number of Bits | Description |
|---|---|---|
| Format | 1 | Set to 0 for HE-SU PPDU. Set to 1 for HE_TRIG PPDU |
| BSS Color | 6 | The BSS Color field is an identifier of the BSS |
| Spatial Reuse | 6 | TBD |
| TXOP Duration | 6 (or 5) | Indicates the remaining time in the current TXOP. Details TBD. |
| Bandwidth | TBD | TBD |
| Reserved | TBD | TBD |
| CRC | 4 | CRC calculated as in 20.3.9.4.4 (CRC calculation for HT-SIG) |
| Tail | 6 | Used to terminate the trellis of the convolutional decoder. Set to 0. |

TABLE 3

| Field | Number of Bits | Description |
|---|---|---|
| DL/UL | 1 | Indicates whether the HE_MU PPDU is UL or DL. This field indicates DL for TDLS. NOTE - The TDLS peer can identify the TDLS frame by To DS and From DS fields in the MAC header of the 11ax MPDU. |
| BSS Color | 6 | The BSS Color field is an identifier of the BSS |
| Spatial Reuse | 6 | TBD |
| TXOP Duration | 6 (or 5) | Indicates the remaining time in the current TXOP. Details TBD. |
| Bandwidth | 4 | Set to 0 for 20 MHz, 1 for 40 MHz, 2 for 80 MHz, 3 for 160 MHz and 80 + 80 MHz |
| SIGB MCS | 3 | Indication the MCS of HE-SIG-B. Set to "000" for MCS0 Set to "001" for MCS1 Set to "010" for MCS2 Set to "011" for MCS3 Set to "100" for MCS4 Set to "101" for MCS5 |
| SIGB DCM | 1 | Set to 1 indicates that the HE-SIG-B is modulated with dual sub-carrier modulation for the MCS. Set to 0 indicates that the HE-SIB-B is not modulated with dual sub-carrier modulation for the MCS. |
| SIGB Number Of Symbols | 4 | Indciates the number of HE-SIG-B symbols. |
| SIGH Compression | 1 | Set to 1 for full BW MU-MIMO. Set to 0 otherwise. |
| Number of HE-LTF Symbols | 3 | Indicates the number of HE-LTF symbols. |
| CP + LTF Size | 3 | To indicate the CP length and HE-LTF size, the current combinations are 1x HE-LTF + 0.8 μS, 2x HE-LTF + 0.8 μS, 2x HE-LTF + 1.6 μS and 4x HE-LTF + 3.2 μS. Other combinations are TBD. |
| LPDC Extra Symbol | 1 | Indication of the presence of the extra OFDM symbol for LDPC. |
| Packet Extension | 3 | The first two bits indicate the "a-factor" and the third bit indicates the PE-Disambiguity. |
| CRC | 4 | CRC calculated as in 20.3.9.4.4 (CRC calculation for HT-SIG) |
| Tail | 6 | Used to terminate the trellis of the convolutional decoder. Set to 0. |

Case that HE-SIG A Field Consists of 1 OFDM Symbol

Figure 15:
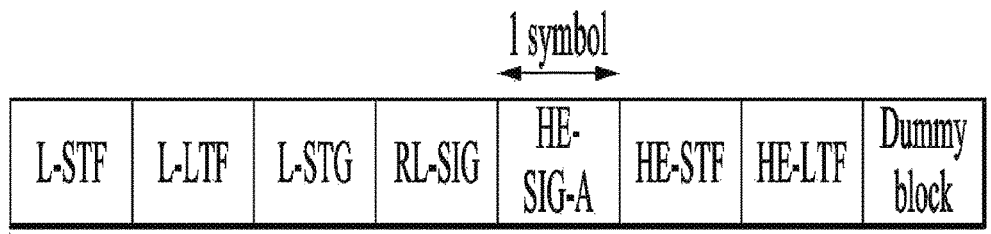
FIG. 15 is a diagram illustrating that an HE-SIG A field of an NDP frame consists of 1 OFDM symbol in accordance with one embodiment of the present invention.

FIG. 15 is a diagram illustrating that an HE-SIG A field of an NDP frame consists of 1 OFDM symbol in accordance with one embodiment of the present invention.

First of all, it is assumed that SU PPDU format is used for NDP frame transmission.

If NDP is transmitted, since the NDP frame does not include a data part, the HE-SIG A field may consist of 1 OFDM symbol unlike a general PPDU format shown in FIG. 8.

In order to reduce a size of HE-SIG-A, first of all, fields required for data transmission in the SU PPDU format of Table 1 may be excluded from HE-SIG-A. For example, fields required for data transmission, such as MCS, CP, coding, LDPC, TXBF, STBC, DCM, Packet extension, and Beam change, may be omitted from HE-SIG-A transmission. Also, since NDP is a frame transmitted immediately after SIFS from NDP-A transmission in the same manner as the sounding procedure, having a very small size including a preamble only without including data, fields such as TXOP duration and spatial reuse may be omitted.

Since format indication information included in HE-SIG-A of Table 1 indicates that PPDU format which is transmitted is SU PPDU or triggered PPDU, it is preferable that format indication of 2 bits is used to additionally perform indication for NDP frame. Since HE-SIG-A consists of 1 symbol in case of NDP, it is preferable that NDPA transmitted prior to NDP includes corresponding information to indicate that HE-SIG-A consists of 1 symbol. One embodiment of the present invention suggests that such information should be transmitted by carrying NDP flag bit in NDP-A, for example, wherein the bit may consist of 1 bit information. If the above bit is 0, it may indicate that HE-SIG-A consists of 1 symbol, and if the bit is 1, it may indicate that the HE-SIG-A consists of 2 symbols.

Alternatively, the NDP frame transmitted after NDP-A may be fixed such that the above format consisting of HE-SIG-A of 1symbol may be used. In this case, since the format of NDP is fixed, it is not required to include information on HE-SIG-A such as the aforementioned NDP flag bit in NDP-A.

If a flag bit for NDP transmission is transmitted from NDPA as above, NDP is transmitted immediately after SIFS timing from NDPA transmission, it is not required to include information on NDP format in HE-SIG-A of the NDP frame. Also, as a value of L-SIG length is set to 0 during NDP frame transmission, information on NDP may be identified even by L-SIG length information, whereby it is not required to increase format information as above. Therefore, in the same manner as the existing case, format bit may be used to identify whether format information bit is SU PPDU by using 1 bit.

The HE-SIG A field of the above-described NDP frame may be configured as follows.

TABLE 4

| Field | Number of bits |
| --- | --- |
| DL/UL | 1 |
| Format | 2 (or 1) |
| BSS Color | 6 |
| Bandwidth | 2 |
| LTF Size | 2 |
| Nsts | 3 |
| CRC | 4 |
| Tail | 6 |

In the above Table, a value of a field used in 11ax may be used as a name of each field as it is. For example, LTF size field information of the above Table may be used by the existing field, CP and LTF type. At this time, only information of LTF type may be used regardless of a value of CP.

As HE-SIG-A is reduced to one symbol as above, overhead of NDP may be reduced, whereby the sounding procedure may be performed more efficiently.

Meanwhile, the case that the NDP frame is used based on the triggered PPDU format will be described.

Since the HE-SIG-A of the triggered PPDU format illustrated in Table 2 transmits fields smaller than those of SU-PPDU through HE-SIG-A, symbols of the HE-SIG-A may be reduced. Therefore, HE-SIG-A of the HE-TRIG PPDU format may be configured as follows to configure the NDP frame.

TABLE 5

| Field | Number of Bits | Description |
| --- | --- | --- |
| Format | 2 | Set to 0 for HE-SU PPDU<br>Set to 1 for HE_TRIG PPDU<br>Set to 2 for HE_NDP PPDU |
| BSS Color | 6 | The BSS Color field is an identifier of the BSS |
| Bandwidth | 2 | Set to 0 for 20 MHz, 1 for 40 MHz, 2 for 80 MHz, 3 for 160 MHz and 80 + 80 MHz |
| Reserved | TBD | TBD |
| CRC | 4 | CRC calculated as in 20.3.9.4.4 (CRC calculation for HT-SIG) |
| Tail | 6 | Used to terminate the trellis of the convolutional decoder. Set to 0. |

A total amount of information of HE-SIG-A carried in the NDP is smaller than information (ex. 26 bits) carried in one symbol. Therefore, HE-SIG-A configured as above consists of one symbol as shown in FIG. 15, and at this time, reserved bits (ex. 6 bits) may be used as information bits for TXOP duration (7 bits) or spatial reuse (16 bits). Therefore, it is suggested that HE-SIG-A of the NDP frame based on the triggered PPDU format is transmitted by including TXOP duration or spatial reuse field.

As another method for using reserved bits, information on LTF and information on Nsts may be transmitted by being included in the HE-SIG-A. Also, information of 2 bits may be used for format indication.

Even in the case that the triggered PPDU is used in the same manner as that SU PPDU is used, since the existing PPDU format is changed to NDP, information such as HE-SIG-A information (NDP flag) and frame format may be transmitted through NDP-A transmitted prior to NDP. Also, since the information on LTF and the information on Nsts are not included in the HE-SIG-A, the above information may be transmitted to the STA through NDPA.

Since it is able to be identified that NDP will be transmitted after NDP-A transmission if HE-SIG-A consisting of one symbol is fixedly used by the NDP frame format unlike the aforementioned description, information on NDP HE-SIG-A, for example, the aforementioned NDP flag information may be omitted.

Also, unlike the HE-SIG-A, format indication used by 2 bits may be set to 1 bit in the same manner as the existing case, and additional 1 bit may be added to NDP HE-SIG-A to indicate whether the above frame is NDP. Alternatively, 1 bit (used for SU and Trigger based identification) is used for format indication in the same manner as the existing case, and indication for NDP may be performed by setting a value of L-SIG length field to 0.

Case that HE-SIG A Field Consists of 2 OFDM Symbols

Figure 16:
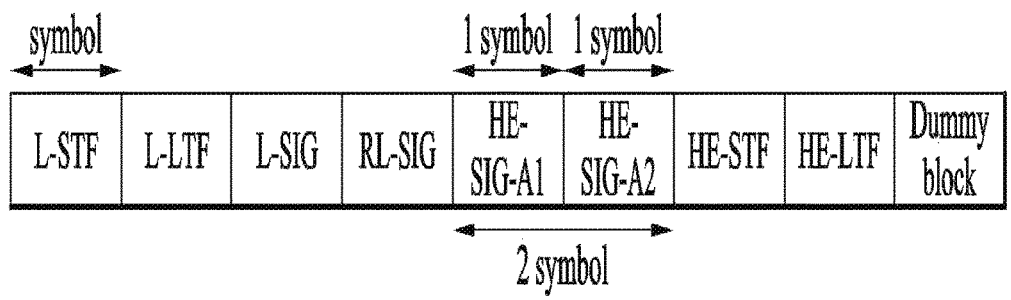
FIG. 16 is a diagram illustrating that an HE-SIG A field of an NDP frame consists of 2 OFDM symbols in accordance with one embodiment of the present invention.

FIG. 16 is a diagram illustrating that an HE-SIG A field of an NDP frame consists of 2 OFDM symbols in accordance with one embodiment of the present invention.

Since flax NDP fame does not include data like NDP frame of 11ac, fields required for data transmission, such as MCS, CP, coding, LDPC, TXBF, STBC, DCM, Packet extension, and Beam change, may not be required during NDP transmission. Therefore, in this embodiment, as shown in FIG. 16, HE-SIG A field of the NDP frame consists of 2 OFDM symbols in the same manner as another PPDU, wherein information bits corresponding to the fields for data transmission may be used to indicate another field or marked with reserved bits. In this case, HE-SIG-A included in the NDP frame may be configured as follows.

TABLE 6

| Field | Number of bits | Description |
|---|---|---|
| DL/UL | 1 | Indicates whether the HE_SU PPDU is UL or DL. This field indicates DL for TDLS.<br>NOTE - The TDLS peer can identify the TDLS frame by To DS and From DS fields in the MAC header of the 11ax MPDU. |
| Format | 2 | Set to 0 for HE-SU PPDU<br>Set to 1 for HE_TRIG PPDU<br>Set to 2 for HE_NDP PPDU |
| BSS Color | 6 | The BSS Color field is an identifier of the BSS |
| Spatial Reuse | 6 | TBD |
| TXOP Duration | 6 (or 5) | Indicates the remaining time in the current TXOP. Details TBD. |
| Bandwidth | 2 | Set to 0 for 20 MHz, 1 for 40 MHz, 2 for 80 MHz, 3 for 160 MHz and 80 + 80 MHz |
| LTF Size | 2 | To indicate the HE-LTF size, the current LTF size are 1x HE-LTF, 2x HE-LTF, 4x HE-LTF |
| Nsts | 3 | Indication of number if spatial streams:<br>Set to 0 for 1 space time stream<br>Set to 1 for 2 space time streams<br>Set to 2 for 3 space time streams<br>Set to 3 for 4 space time streams<br>Set to 4 for 5 space time streams<br>Set to 5 for 6 space time streams<br>Set to 6 for 7 space time streams<br>Set to 7 for 8 space time streams |
| Reserved | TBD | |
| CRC | 4 | CRC calculated as in 20.3.9.4.4 (CRC calculation for HT-SIG) |
| Tail | 6 | Used to terminate the trellis of the convolutional decoder. Set to 0. |

2 bits may be used as format information to indicate an NDP frame format, and at this time, information on NDP frame transmission may first be transmitted through NDP-A in the same manner as the embodiment in which the SU PPDU format and triggered PPDU format are used and HE-SIG A consists of 1 OFDM symbol. Also, since information on data transmission is not transmitted, many reserved bits are generated. At this time, the above bits may be used to transmit one of TXOP duration field and spatial reuse field or both of them.

As a method different from the method for using LTF size information as 2 bits, if NDP flag 1 bit transmitted through NDPA is flagged to 1, 3-bit information of the legacy CP+LTF size field may be reinterpreted in such a manner that LTF size is notified using 2 bits only.

Unlike the above-described embodiments in which 2 bits are used as format bits to indicate the NDP frame, SU PPDU and Triggered PPDU may be identified from each other using 1 bit in the same manner as the existing format indication, and 1 bit indication for the NDP format may be added to determine whether the initially identified PPDU has been used as NDP. Therefore, the existing 1-bit format indication and additional 1-bit NDP format indication may be included in the HE-SIG-A to indicate NDP without using format bits of 2 bits unlike the aforementioned description.

Alternatively, unlike the aforementioned description, the same fields as those of 2-symbol HE-SIG-A of the legacy SU PPDU are included in the HE-SIG-A, and only values of fields corresponding to the following table among the fields of the HE-SIG-A included in NDP frame transmission may be set and then transmitted. Information which is not included in the above information may be set to 0 and then transmitted. Also, information which is not included in the above information may not be considered during reception. For example, information required for NDP transmission is as follows.

Table 7

TABLE 7

Figure 17:
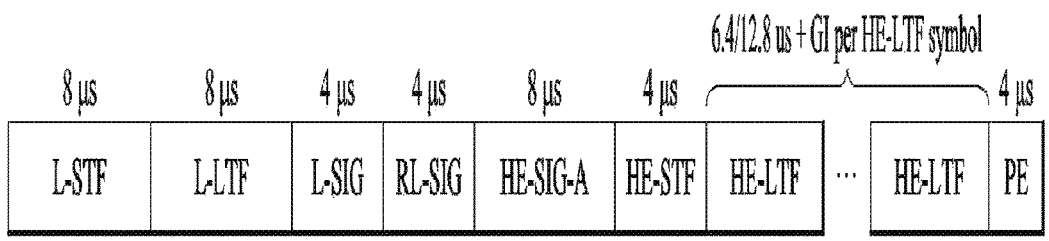
FIG. 17 is a diagram illustrating an NDP frame structure according to another embodiment of the present invention.

DL/UL:1 bit Format:1 bit BW:2 bit BSS color:6 bit CP and LTF type:2 bit
Nsts:3 bit
Txop:7 bitCRC:4 bit Tail:6 bit FIG. 17 is a diagram illustrating an NDP frame structure according to another embodiment of the present invention.

It is assumed that the NDP frame structure shown in FIG. 17 is based on HE SU PPDU format and NDP frame from which data field is omitted. In the structure of the NDP frame, it is assumed that 2x HE-LTF is used as a necessary mode for NDP and 4x HE-LTF is selectively used.

In FIG. 17, a PE (Packet Extension) field may be used to give a spare time for a processing time required to process required information after channel estimation as a length of 11ax PPDU is changed as compared with 11ac. This may correspond to a case that a dummy block of FIGS>15 and 16 is used. FIG. 17 illustrates that PE has, but not limited to, a length of 4 us.

It is assumed that the NDP PPDU according to the embodiment shown in FIG. 17 uses 1.6 us as a GI value or uses 0.8 us as a necessary GI value. If 4x HE-LTF sequence is sued for the NDP PPDU, GI may be set to 3.2 us.

Also, FIG. 17 illustrates that HE-SIG-A has a length of 8 us and 2-OFDM symbol length in the same manner as FIG. 16.

Figure 18:
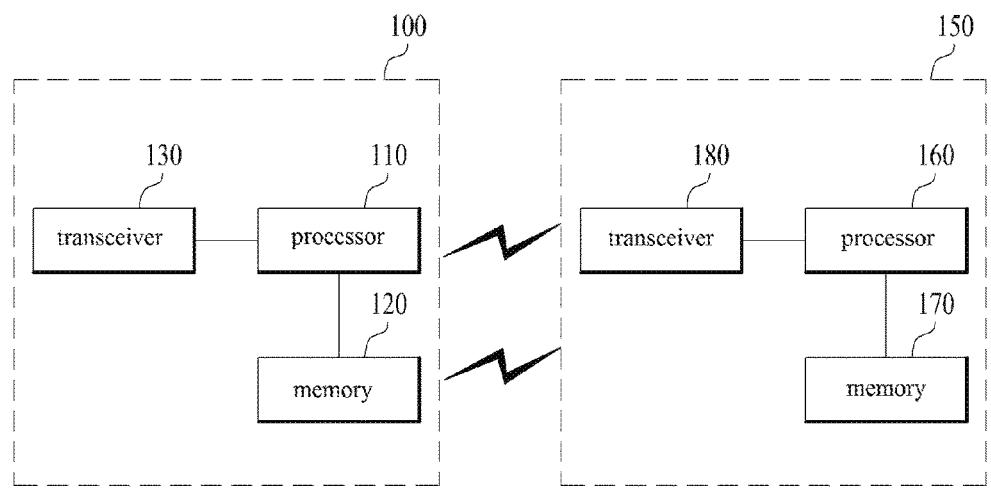
FIG. 18 is a block diagram illustrating an exemplary configuration of an AP apparatus (or base station) and a station apparatus (or UE) according to one embodiment of the present invention.

FIG. 18 is a block diagram for an exemplary configuration of an AP (or a base station) and an STA (or a UE) according to one embodiment of the present invention.

An AP 100 can include a processor 110, a memory 120, and a transceiver 130. An STA 150 can include a processor 160, a memory 170, and a transceiver 180.

The transceiver 130/180 can transmit/receive a radio signal and implement a physical layer according to IEEE 802 system. The processor 110/160 is connected with the transceiver 130/180 and can implement a physical layer and/or a MAC layer according to IEEE 802 system. The processor 110/160 is configured to perform an operation according to one or a combination of two or more embodiments of the present invention. A module for implementing operations of the AP and the STA according to the various embodiments of the present invention is stored in the memory 120/170 and the module can be executed by the processor 110/160. The memory 120/170 can be connected with the processor 110/160 via a well-known media in a manner of being included in the processor 110/160 or being installed in the outside of the processor 110/160.

Explanation on the AP 100 and explanation on the STA 150 can be respectively applied to a base station and a user equipment in a different wireless communication system (e.g., LTE/LTE-A system).

The configurations of the AP and the STA as described above may be implemented such that the above-described embodiments can be independently applied or two or more thereof can be simultaneously applied, and description of redundant parts is omitted for clarity.

Figure 19:
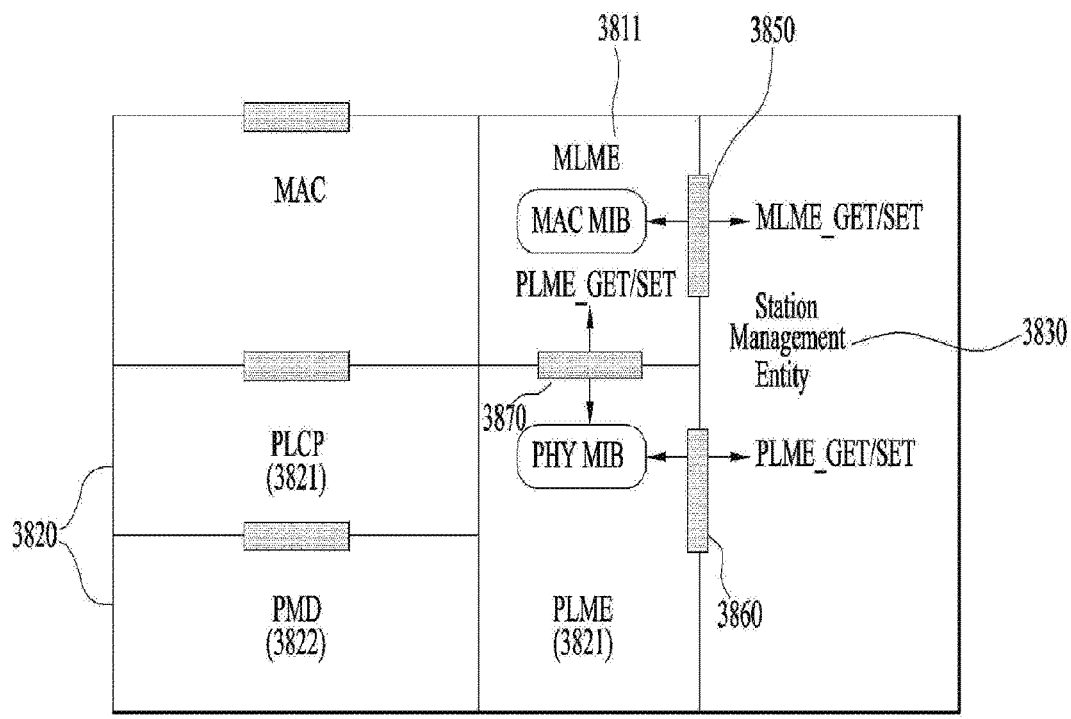
FIG. 19 is a diagram illustrating an exemplary structure of a processor of an AP or a station according to one embodiment of the present invention.

FIG. 19 is a diagram for an exemplary configuration of a processor of an AP or an STA according to one embodiment of the present invention.

A processor of an AP or an STA may have a structure of a plurality of layers. FIG. 19 mainly shows a MAC sublayer 3810 and a physical layer 3820 on a DLL (data link layer) among a plurality of the layers. As shown in FIG. 19, the PHY 3820 can include a PLCP (physical layer convergence procedure) entity 3821 and a PMD (physical medium dependent) entity 3822. Both the MAC sublayer 3810 and the PHY 3820 include management entities conceptually referred to as an MLME (MAC sublayer management entity) 3811. The entities 3811/3821 provide a layer management service interface in which a layer management function is operating.

In order to provide a precise MAC operation, an SME (station management entity) 3830 exists in each STA. The SME 3830 corresponds to a layer-independent entity capable of exiting in a separate management plane or capable of being seen as a separate entity (off to the side). Although precise functions of the SME 3830 are not explained in detail in the present specification, the entity 3830 is in charge of collecting lay-dependent status from various layer management entities and similarly configuring values of layer-specific parameters. In general, the SME 3830 performs the aforementioned functions on behalf of a general system management entity and may be able to implement a standard management protocol.

The entities shown in FIG. 19 interact with each other using various schemes. FIG. 19 shows several examples of exchanging GET/SET primitives. XX-GET.request is used to request a value of a given MIB attribute (management information-based attribute information). If status corresponds to "success", XX-GET.confirm primitive returns an appropriate MIB attribute information value. Otherwise, the XX-GET.confirm primitive is used to return an error indication to a status field. XX-SET.request primitive is used to request that an indicated MIB attribute is configured by a given value. If the MIB attribute corresponds to a specific operation, it indicates that the MIB attribute requests to perform the specific operation. If status corresponds to "success", XX-SET.confirm primitive confirms that an MIB attribute is configured by a requested value. Otherwise, the XX-SET.confirm primitive is used to return an error condition to a status field. If the MIB attribute corresponds to a specific operation, it confirms that the specific operation has been performed.

As shown in FIG. 19, the MLME 3811 and the SME 3830 can exchange various MLME_GET/SET primitives with each other via an MLME_SAP 3850. And, various PLCM_GET/SET primitives can be exchanged between the PLME 3821 and the SME 3830 via a PLME_SAP 3860 and can be exchanged between the MLME 3811 and the PLME 3821 via a MLME-PLME_SAP 3870.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein. The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

And, both an apparatus invention and a method invention are explained in the present specification and the explanation on the both of the inventions can be complementally applied, if necessary.

INDUSTRIAL APPLICABILITY

As described above, the embodiments of the present invention may be applied to various wireless communication systems including the IEEE 802.11 system.

What is claimed is:

1. A method for an access point (AP) to acquire channel quality information in a wireless local area network (WLAN) system, the method comprising:
    transmitting, to at least one station (STA), a null data packet announcement (NDP-A) frame including information on a null data packet (NDP) frame;

transmitting the NDP frame to the at least one STA following the NDP-A frame; and receiving, from the at least one STA, a feedback frame including downlink channel quality information, wherein the NDP frame includes an L-part for a legacy STA and a HE-part for a HE (high efficiency) STA, wherein the HE-part consists of an HE-signaling A (HE-SIG A) field, an HE-short training field (HE-STF), and an HE-long training field (HE-LTF), wherein the NDP frame has a Single User Physical Protocol Data Unit (SU PPDU) format, and wherein, if the HE-SIG A field has a 1 OFDM symbol length, the SU-PPDU format does not include a TXOP duration field and a spatial reuse field in the HE SIG A field.

2. The method according to claim 1, wherein the NDP frame does not include a data field and an HE-signaling B (HE-SIG B) field.

3. A method for a station (STA) to transmit a frame for uplink channel quality information in a wireless local area network (WLAN) system, the method comprising:

receiving, from at least one access point (AP), a null data packet announcement (NDP-A) frame including information on a null data packet (NDP) frame; and receiving the NDP frame from the AP following the NDP-A frame, wherein the NDP frame includes an L-part for a legacy STA and a HE -part for an HE (High Efficiency) STA, wherein the HE-part consists of an HE-signaling A (HE-SIG A) field, an HE-short training field (HE-STF), and an HE-long training field (HE-LTF), wherein the NDP frame has a Single User Physical Protocol Data Unit (SU PPDU) format, and wherein, if the HE-SIG A field has a 1 OFDM symbol length, the SU-PPDU format does not include a TXOP duration field and a spatial reuse field in the HE SIG-A field.

4. The method according to claim 3, wherein the NDP frame does not include a data field and an HE-signaling B (HE-SIG B) field.

5. An access point (AP) apparatus operating in a wireless local area network (WLAN) system, the AP apparatus comprising:

a transceiver transmitting, to at least one station (STA), a null data packet announcement (NDP-A) frame including information on a null data packet (NDP) frame, transmitting an NDP frame to the at least one STA following the NDP-A frame, and receiving, from the at least one STA, a feedback frame including downlink channel quality information; and a processor generating the NDP-A frame and the NDP frame, delivering the generated NDP-A frame and the NDP frame to the transceiver and receiving the feedback frame from the transceiver, wherein the processor is configured to generate the NDP frame to include an L-part for a legacy STA and a HE-part for a HE (High Efficiency) STA, wherein the processor generates the HE-part consisting of an HE-signaling A (HE-SIG A) field, an HE-short training field (HE-STF), and an HE-long training field (HE-LTF), wherein the NDP frame has a Single User Physical Protocol Data Unit (SU PPDU) format, and wherein, if the HE-SIG A field has a 1 OFDM symbol length, the SU-PPDU format does not include a TXOP duration field and a spatial reuse field in the HE SIG A field.

6. The AP apparatus according to claim 5, wherein the processor generates the NDP frame such that the NDP frame does not include a data field and an HE-signaling B (HE-SIG B) field.

7. A station (STA) apparatus operating in a wireless local area network (WLAN) system, the station apparatus comprising:

a transceiver receiving, from at least one access point (AP), a null data packet announcement (NDP-A) frame including information on a null data packet (NDP) frame, and receiving the NDP frame from the AP; and a processor processing at least one of the NDP-A frame or the NDP frame received from the transceiver, wherein the NDP frame includes an L-part for a legacy STA and a HE-part for a HE (High Efficiency) STA, wherein the HE-part consists of an HE-signaling A (HE-SIG A) field, an HE-short training field (HE-STF), and an HE-long training field (HE-LTF), wherein the NDP frame has a Single User Physical Protocol Data Unit (SU PPDU) format, and wherein, if the HE-SIG A field has a 1 OFDM symbol length, the SU-PPDU format does not include a TXOP duration field and a spatial reuse field in the HE SIG A field.

8. The STA apparatus according to claim 7, wherein the NDP frame does not include a data field and an HE-signaling B (HE-SIG B) field.

9. The method according to claim 1, wherein the NDP frame further includes a packet extension field providing additional receive processing time at an end of the NDP frame.

10. The method according to claim 9, wherein the packet extension field has a 4 micro second length.

* * * * *